(12) United States Patent
Nakashima et al.

(10) Patent No.: US 6,511,586 B1
(45) Date of Patent: Jan. 28, 2003

(54) MARINE ORGANISM PREVENTION SYSTEM FOR STRUCTURES IN SEAWATER

(75) Inventors: Shoji Nakashima, Yokohama (JP); Shigeru Sakurada, Kisarazu (JP); Shuichi Inagaki, Yokosuka (JP); Tadahiko Oba, Tokyo-to (JP); Hidetoshi Usui, Urawa (JP); Takahiro Kajiyama, Osaka (JP)

(73) Assignees: Kabushiki Kaisha Toshiba, Kawasaki (JP); Nakabohtec Corrosion Protecting Co., Ltd., Tokyo-To (JP)

( * ) Notice: Subject to any disclaimer, the term of this patent is extended or adjusted under 35 U.S.C. 154(b) by 0 days.

(21) Appl. No.: 09/807,467
(22) PCT Filed: Oct. 14, 1999
(86) PCT No.: PCT/JP99/05677
§ 371 (c)(1), (2), (4) Date: Apr. 13, 2001
(87) PCT Pub. No.: WO00/22240
PCT Pub. Date: Apr. 20, 2000

(30) Foreign Application Priority Data

Oct. 14, 1998 (JP) .................................. 10-292142

(51) Int. Cl.$^7$ .................................. C23F 13/00
(52) U.S. Cl. .................... 204/196.01; 204/196.02; 204/196.03; 204/196.37
(58) Field of Search ................ 205/727, 728, 205/734, 738, 740; 204/196.37, 196.01, 196.02, 196.03

(56) References Cited

U.S. PATENT DOCUMENTS

| 4,256,556 A | 3/1981 | Bennett et al. ............. 204/147 |
| 4,345,981 A | 8/1982 | Bennett et al. ............. 204/129 |

FOREIGN PATENT DOCUMENTS

| JP | 1-46595 | 10/1989 |
| JP | 10-271942 | 10/1998 |

*Primary Examiner*—Bruce F. Bell
(74) *Attorney, Agent, or Firm*—Foley & Lardner

(57) ABSTRACT

An antifouling system (20) for a structure exposed to seawater has an anode forming member (4) bonded to the seawater-exposed surface to be wetted with seawater (15) of the structure via an insulating adhesive (6). The anode forming member 4 is coated with an electrical catalyst film 3 of an electrochemically active and stable electrical catalyst. A conductive member (8) is disposed so as to be wetted with seawater (15). An external dc power supply (7) has a positive terminal (7*a*) connected to the anode forming member (4) and a negative terminal (7*b*) connected to the conductive member (8). The external DC power supply (7) is provided with a built-in automatic potential controller (7*c*) that controls the potential difference between the positive terminal (7*a*) and the negative terminal (7*b*) such that oxygen can be generated in seawater suppressing the generation of chlorine in seawater. Even if a rubber lining coating a metal part of the structure is broken, abnormal corrosion of the metal part corresponding to a damaged part of the rubber lining can be prevented.

17 Claims, 5 Drawing Sheets

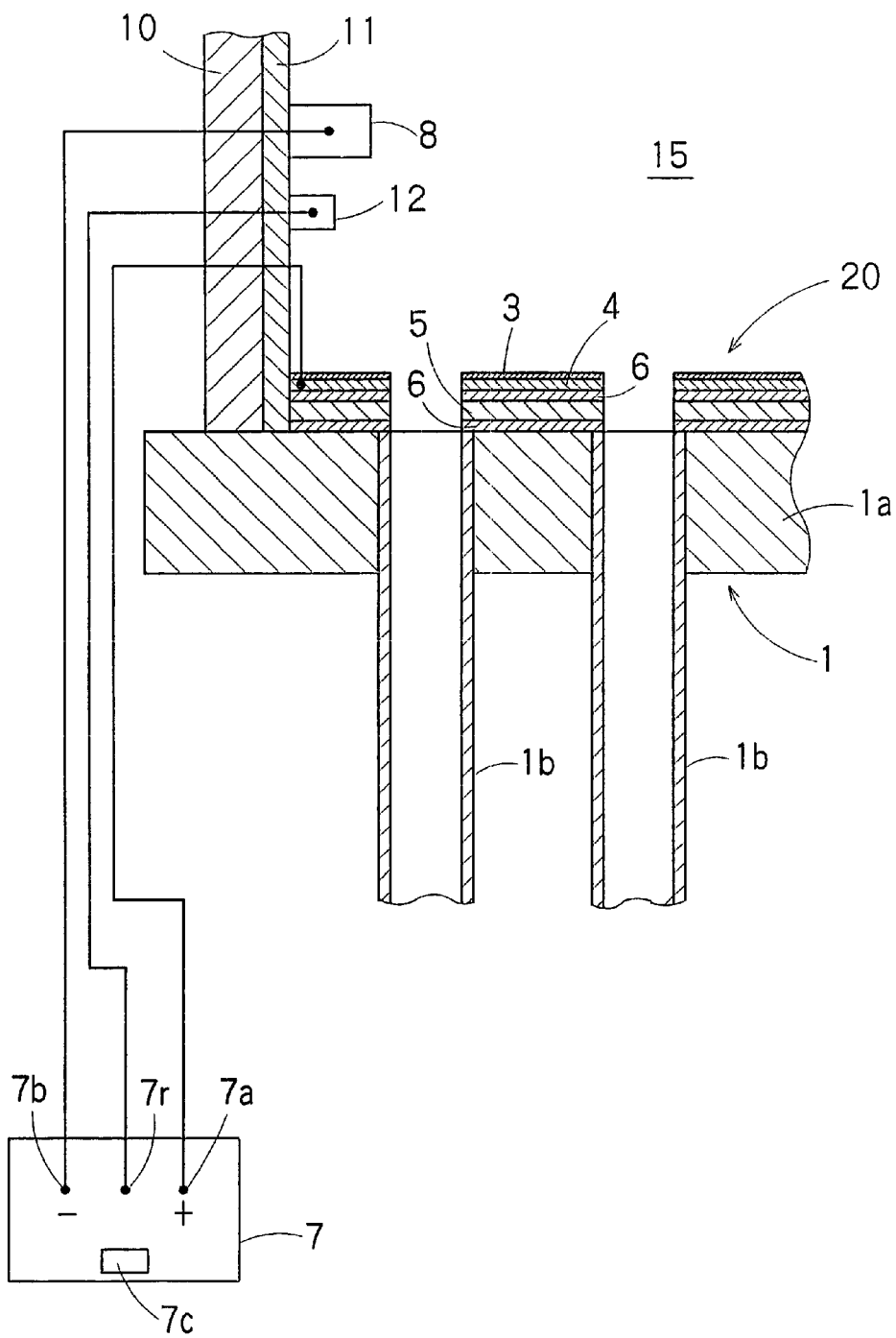
F I G. 1

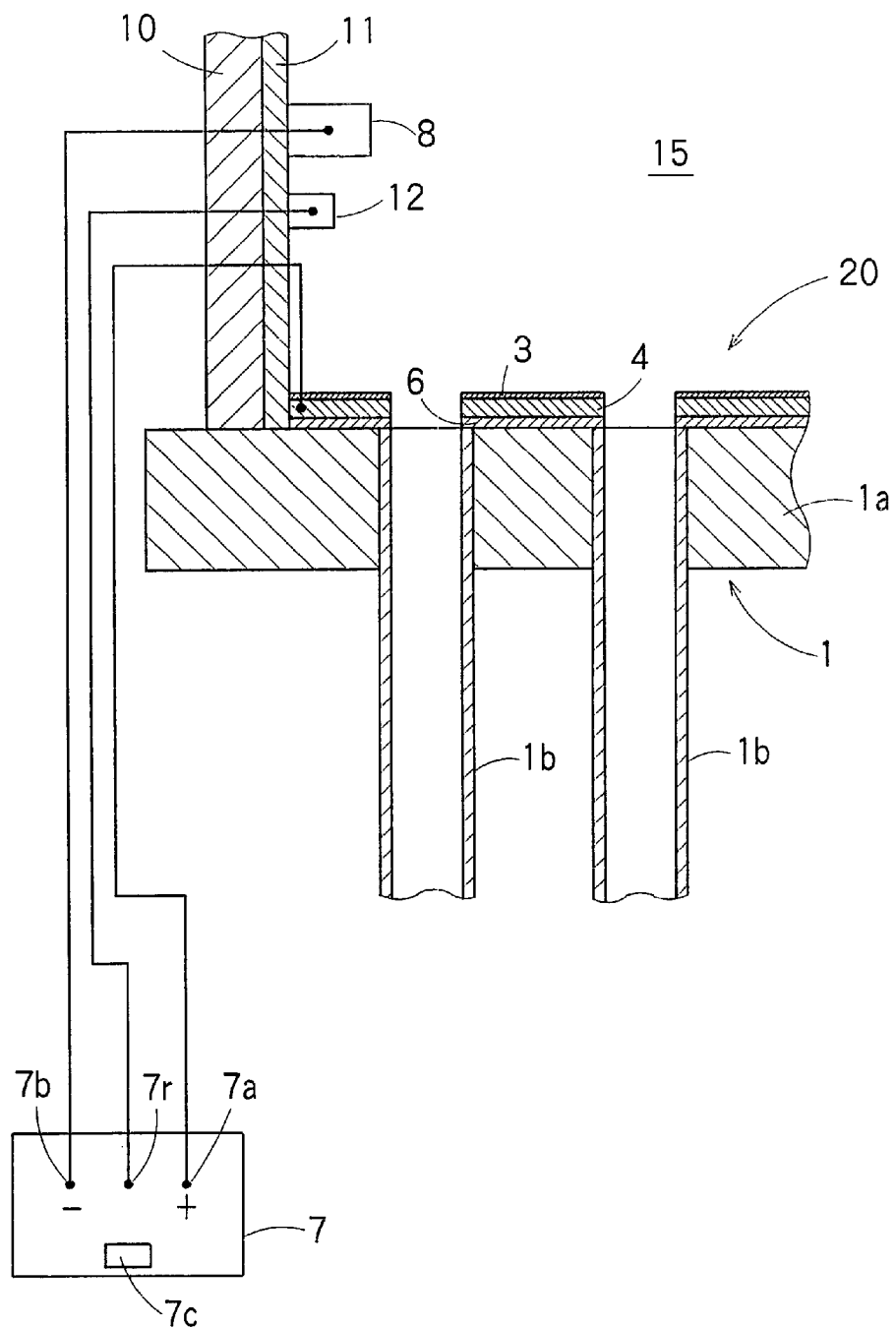
F I G. 2

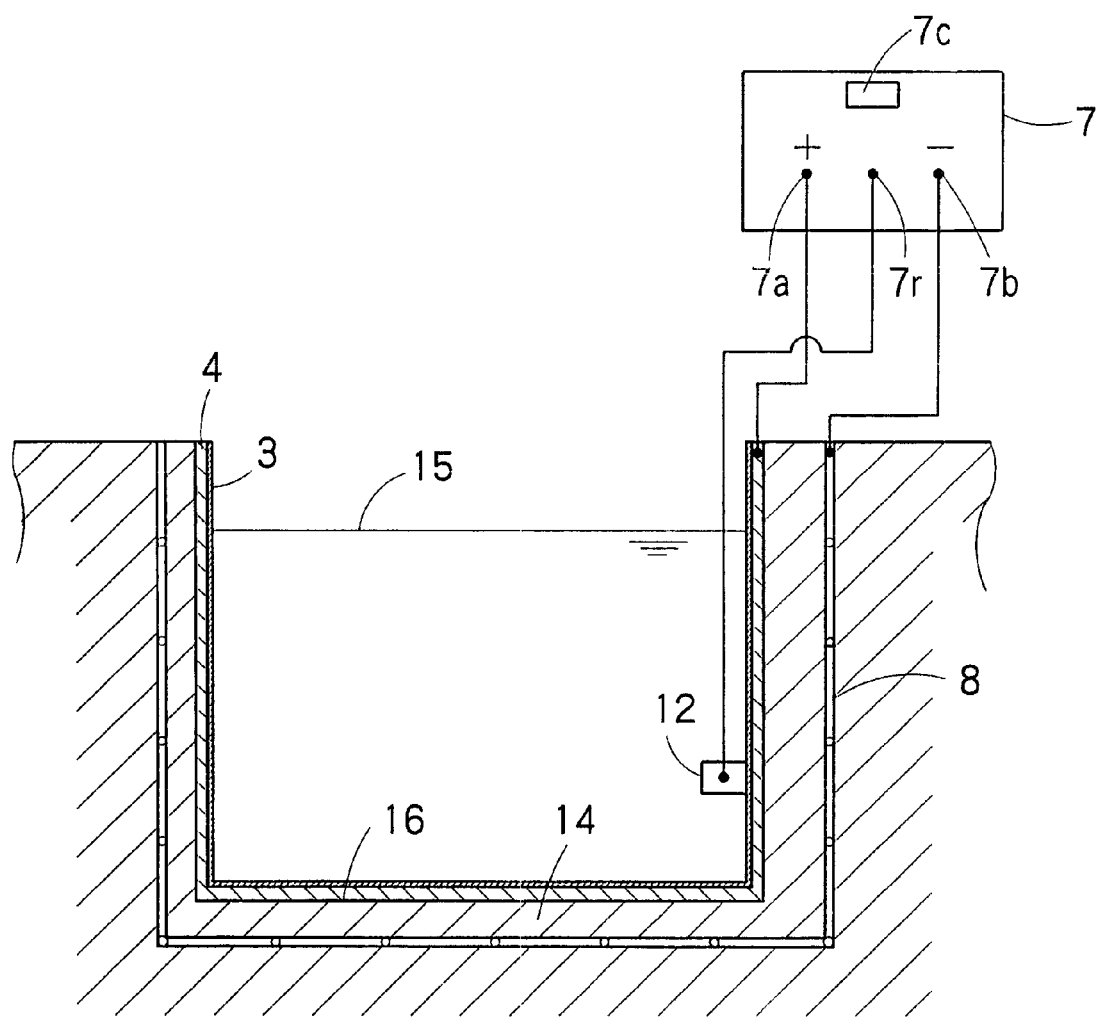
F I G. 5

MARINE ORGANISM PREVENTION SYSTEM FOR STRUCTURES IN SEAWATER

TECHNICAL FIELD

The present invention relates to an antifouling system for preventing marine organisms from attaching to surfaces of a structure exposed to seawater and, more particularly, to an antifouling system capable of generating oxygen by the agency of an electrical catalyst provided on a surface of a structure exposed to seawater in order to prevent marine organisms from attaching to the surface of the structure exposed to seawater.

BACKGROUND ART

In some power plant that uses seawater as cooling water, blue mussels, barnacles, hydrozoans or marine plants, which will be inclusively referred to as "marine organisms", tend to attach to an inlet and an outlet pipe plates for heat-exchanger-holding heat transfer pipes. These marine organisms block up end parts of the heat transfer pipes so that passage of a cleaning sponge through the heat transfer pipes is obstructed and/or that insides of the heat transfer pipes are narrowed. Therefore, the power plant is frequently forced to stop its operation unavoidably to remove the marine organisms. These marine organisms are liable to attach to pipe plates and/or heat transfer pipes that are made of titanium and that have corrosion-resistance in seawater, more than to pipe plates and heat transfer pipes made of a copper alloy.

In a steel water chamber lined with a rubber lining, larvae of marine organisms passed through a strainer net may attach to the rubber liner, and the larvae of marine organisms repeats growing on the rubber lining and falling off the rubber lining. This may clog heat transfer pipes for cooling.

Measures taken to exterminate the marine organisms and to prevent attachment of the marine organisms to the structure (hereinafter referred to as "antifouling measures") include pouring chlorine or chlorine compound into the ambient region of the sea around the structure, coating the structure with antifouling paint containing toxic-ion-producing pigment and producing of toxic ions such as chlorine ions or copper ions by electrolysis of seawater.

Although these antifouling measures exercise effective antifouling functions, amount and concentration is not easy to be managed, and the concentration is liable to be excessively increased in anticipation of reliable antifouling effect. Consequently, it is highly possible that the antifouling measures cause environmental pollution. Therefore, it is recent trend that use of such antifouling measures is inhibited or controlled.

Recently, many research workers and engineers are engaged in development of antifouling measures that do not use toxic substances. For example, antifouling silicone paints are nonpolluting and nontoxic but have antifouling effect. However, antifouling silicone paints have not been prevalently used because their drawbacks including shortening of service life of antifouling silicone paints by contact with foreign matters such as shells, high costs of work for application of the antifouling silicone paints, difficulty in finding suitable applying means capable of simply and easily applying the antifouling silicone paints to structures having a large surface area and/or existing structures, and reduction of the antifouling effect of antifouling silicone paints when flow of seawater is stopped.

A method mentioned in JP-B No. Hei 01-46595 forms an electrical catalyst film, mainly consisting of a mixed crystal of metals of platinum group or a mixture of oxides of those metals, on the surface of a titanium heat exchanger or the like to be exposed to seawater, and generates a sufficient amount of oxygen substantially without generating chlorine gas by electrolysis using the titanium heat exchanger as an anode to control attachment of marine organisms to the heat exchanger or formation of scales on the heat exchanger.

However, since this prior art method forms the electrical catalyst film over the surfaces of titanium structural members to be exposed to water or seawater and uses the titanium structural members as an anode, other metallic members, such as a water chamber or pipes that are usually made of steels and lined with rubber linings, of the heat exchanger electrically connected to the titanium structural members are similarly loaded as the anode. If, by any chance, the rubber linings or the like should be damaged, a current flows through a part of the metallic members corresponding to a damaged part of the rubber linings so that a structural member of a metal other than titanium may be subject to abnormal corrosion.

Moreover, this prior art method conducts an electrical resistance heating process at temperatures in the range of 350 to 450° C. for several hours for activation of the electrical catalyst. This electrical resistance heating process is possible to damage the structure by generated heat and/or thermal stresses, and requires an enormous cost. Accordingly, this prior art method has not been prevalently practiced.

DISCLOSURE OF THE INVENTION

As mentioned above, the prior art technique mentioned in JP-B No. Hei 01-46595 coats the titanium members of a heat exchanger directly with the electrical catalyst film, heats the titanium members at temperatures in the range of 350 to 450° C. for several hours by means of an electrical resistance heating or the like for the thermal activation, and uses the same as an anode. Therefore, it is possible that the structure is damaged by heat applied thereto and/or thermal stresses induced therein. In addition, such electrical resistance heating requires an enormous cost.

Generally, in the titanium heat exchangers, only the heat transfer pipes and the pipe plates are titanium members, but the body, the water chamber, suction pipes for carrying seawater to the heat exchanger and discharge pipes for discharging used seawater into the sea are made of steels. Since the steel water chamber, the steel suction pipes and the steel discharge pipes are electrically connected to the titanium members, the same are subject to galvanic corrosion when exposed to seawater and may be heavily corroded. Therefore, the surfaces of the steel members that may be wetted with seawater are coated with rubber linings for preventing corrosion.

If, by any chance, a rubber lining of a steel member is damaged, the titanium member electrically connected to the steel member must be cathodically loaded by a cathodic protection method that lowers potential of the steel member to a protection potential thereof. However, since the aforesaid prior art technique uses the titanium member as an anode, the steel water chamber, the suction pipes and the discharge pipes connected therewith are anodically loaded, and hence the cathodic protection method cannot be applied in principle so that a current flows through a part of the steel member corresponding to a damaged part of the rubber lining and that the steel member is abnormally corroded.

It is an object of the present invention to provide an antifouling system capable of easily forming an electrical catalyst on a surface of a titanium pipe plate or the like of a heat exchanger, without applying heat to the titanium pipe plate or the like by electric resistance heating or the like, capable of electrically isolating the electrical catalyst from structural members such as the titanium pipe plates, and capable of preventing abnormal corrosion of a part of a metal member corresponding to a damaged part of a rubber lining or the like coating the metal member, by employing a cathodic protection method even when the rubber lining or the like is damaged by some rare accident.

According to the present invention, an antifouling system that generates oxygen on a seawater-exposed surface of a structure to be exposed to seawater to prevent attachment of marine organisms to the seawater-exposed surface of the structure comprises: an anode forming member bonded to the seawater-exposed surface of the structure to be exposed to seawater via an insulating adhesive; an electrochemically active and stable electrical catalyst coated on the anode forming member; a conductive member disposed so as to be wetted with seawater; and an external DC power supply having a positive terminal connected to the anode forming member or the electrical catalyst, and a negative terminal connected to the conductive member, and including an automatic potential controller; wherein a potential difference between the positive and the negative terminals of the external DC power supply is set in order to generate oxygen in seawater while suppressing generation of chlorine in seawater.

According to the present invention, the anode forming member coated in advance by the electrical catalyst can be easily bonded to the seawater-exposed surface of the structure with the insulating adhesive at an ordinary temperature. Thus, the structure may not be damaged by thermal stresses or the like. In addition, because of the insulating adhesive, the anode forming member can be electrically insulated from the structure such as the titanium pipe plates. Thus, abnormal corrosion of a part of a metal member corresponding to a damaged part of a rubber lining or the like protecting the metal member electrically connected to the titanium pipe plate or the like can be prevented even when the rubber lining is broken by some rare accident.

Preferably, an insulating sheet is disposed between the seawater-exposed surface of the structure to be exposed to seawater and the anode forming member.

Preferably, the electrical catalyst is a single substance of a metal of the platinum group, a metal oxide of the platinum group, cobalt oxide or manganese oxide, a mixed crystal substance thereof or a complex substance thereof.

Preferably, the anode forming member is a titanium member, more preferably, a titanium sheet. Preferably, the titanium sheet has a thickness in the range of 0.1 to 0.3 mm and can be wound in a coil. Preferably, the titanium sheet is divided into a plurality of pieces, and conductive tapes are used to electrically connect adjacent pieces of the titanium sheet.

Preferably, the insulating adhesive is an elastic adhesive mainly containing a denatured and an epoxy resin and providing a stable bond strength when the temperature of seawater is in the range of 0 to 50° C.

When the structure to be exposed to seawater is a titanium heat exchanger having a plurality of titanium heat transfer pipes and one or more titanium pipe plates supporting the plurality of titanium heat transfer pipes, it is preferable that the anode forming member is provided with a plurality of openings corresponding to diameters of the plurality of titanium heat transfer pipes.

According to the present invention, an antifouling system that generates oxygen on a seawater-exposed insulating part of a structure to be exposed to seawater to prevent attachment of marine organisms to the seawater-exposed insulated part of the structure comprises: an anode forming member provided at the seawater-exposed insulating part of the structure; an electrochemically active and stable electrical catalyst coated on the anode forming member; a conductive member disposed so as to be wetted with seawater; and an external DC power supply having a positive terminal connected to the anode forming member or the electrical catalyst, and a negative terminal connected to the conductive member, and including an automatic potential controller; wherein the potential difference between the positive and the negative terminals of the external DC power supply is set in order to generate oxygen in seawater while suppressing generation of chlorine in seawater.

According to the present invention, since the oxygen can be generated around the seawater-exposed insulating part of the structure while suppressing the generation of chlorine, the attachment of marine organisms to the structure can be prevented.

In this antifouling system also, it is preferable that the electrical catalyst is a single substance of a metal of the platinum group, a metal oxide of the platinum group, cobalt oxide or manganese oxide, a mixed crystal substance thereof or a complex substance thereof.

Similarly, it is preferable that the anode forming member is a titanium member, more preferably, a titanium sheet. Preferably, the titanium sheet has a thickness in the range of 0.1 to 0.3 mm and can be wound in a coil. Preferably, the titanium sheet is divided into a plurality of pieces, and conductive tapes are used to electrically connect adjacent pieces of the titanium sheet.

The seawater-exposed surface of the insulating part of the structure to be exposed to seawater may be a wall surface coated with a rubber or resin lining.

When the structure to be exposed to seawater is a concrete structure, it is preferable that the conductive member is a reinforcing bar for the concrete structure.

BRIEF DESCRIPTION OF THE DRAWINGS

FIG. 1 is a schematic sectional view of an antifouling system for a structure to be exposed to seawater in a first embodiment according to the present invention;

FIG. 2 is a schematic sectional view of an antifouling system for a structure to be exposed to seawater in a second embodiment according to the present invention;

FIG. 5 is a schematic sectional view of an antifouling system for a structure to be exposed to seawater in a fifth embodiment according to the present invention.

BEST MODE FOR CARRYING OUT THE INVENTION

Figure 3:
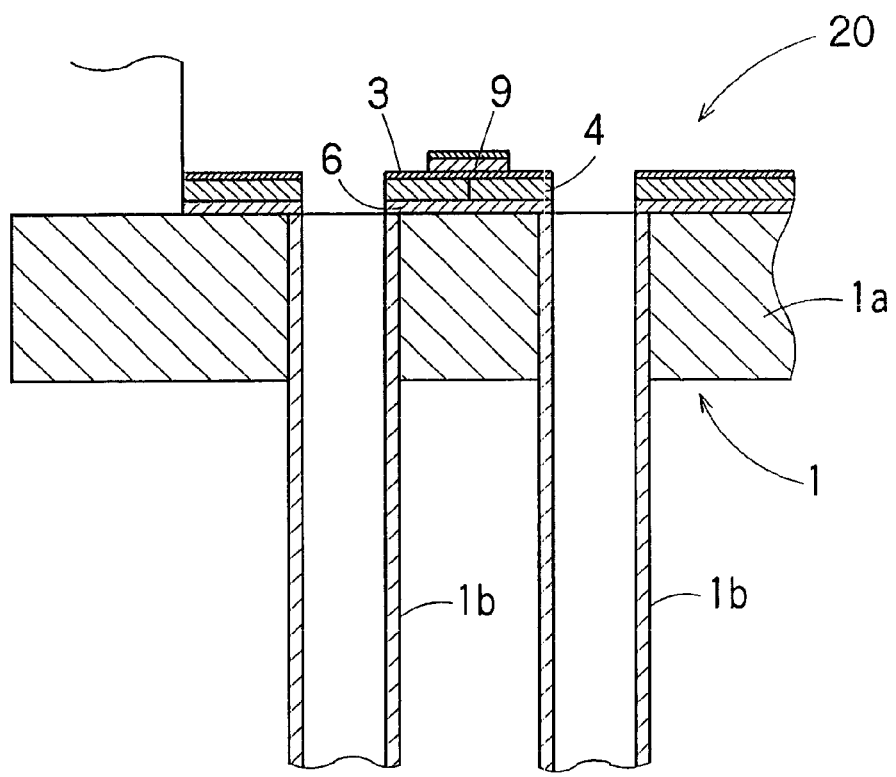
FIG. 3 is a schematic sectional view of an antifouling system for a structure to be exposed to seawater in a third embodiment according to the present invention.

Preferred embodiments of the present invention will be described hereinafter with reference to the accompanying drawings.

FIG. 1 is a schematic sectional view of an antifouling system for a structure to be exposed to seawater in a first embodiment according to the present invention. As shown in FIG. 1, the antifouling system 20 for the structure to be exposed to seawater of the first embodiment according to the present invention generates oxygen on a seawater-exposed surface exposed to seawater 15 of a titanium heat exchanger 1 (structure) in order to prevent attachment of marine organisms to the seawater-exposed surface exposed to seawater 15 of the heat exchanger 1.

The heat exchanger 1 has a plurality of titanium heat transfer pipes 1b and a titanium pipe plate 1a supporting the plurality of titanium heat transfer pipes 1b. As shown in FIG. 1, a water chamber 10 whose inside surface is covered with rubber linings 11 is formed on a side of seawater 15 of the heat exchanger 1.

The antifouling system 20 has an insulating sheet 5 bonded to the seawater-exposed surface of the heat exchanger 1 via an insulating adhesive 6 so as to cover the seawater-exposed surface substantially entirely. A panel-like titanium sheet 4 (anode forming member) of a thickness in the range of 0.1 to 0.3 mm is bonded to an upper surface of the insulating sheet 5 with the insulating adhesive 6 so as to cover the upper surface of the insulating sheet 5 substantially entirely.

The insulting adhesive 6 is a high-performance elastic adhesive containing a modified silicone polymer and an epoxy resin as principal components. The insulating adhesive 6 has a high insulating property and exercises stable bond strength in the seawater temperature range of 0 to 50° C.

As shown in FIG. 1, the insulating sheet 5 and the panel-like titanium sheet 4 are provided with a plurality of openings corresponding to the diameters of the plurality of titanium pipes 1b.

An upper surface of the panel-like titanium sheet 4 is covered with an electrochemically active and stable electrical catalyst 3 formed beforehand by means of a catalyst film forming process and heated for thermal activation in the range of 350 to 450° C. for several hours by means of an electric resistance heating or the like. The electrical catalyst 3 is a single substance of a metal of the platinum group, a metal oxide of the platinum group, cobalt oxide or manganese oxide, a mixed crystal substance thereof or a complex substance thereof.

A conductive member 8 is projected from the rubber lining 11 toward seawater 15. Similarly, a reference electrode 12 is also projected.

The antifouling system 20 has an external DC power supply 7 having a positive terminal 7a connected to the panel-like titanium sheet 4, a negative terminal connected to the conductive member 8, and a reference terminal 7r connected to the reference electrode 12. The external DC power supply 7 includes an automatic potential controller 7c therein. A potential difference between the positive terminal 7a and the negative terminal 7b in a current circuit formed therebetween is set such that generation of chlorine in seawater 15 is suppressed while oxygen is generated in seawater 15. More concretely, the potential difference is lower than an SCE standard potential of 1.13 V at which chlorine is generated by electrolysis of seawater, and higher than an oxygen generating potential of 0.52 V at which oxygen is generated in standard seawater. The reference electrode 12 is used for monitoring the potential of the titanium sheet 4, and data provided by the reference electrode 12 are used in the automatic potential controller 7c.

An operation of the antifouling system of the first embodiment will be described hereinafter.

A potential of the panel-like titanium sheet 4 i.e. the electrical catalyst 3 serving as an anode is maintained in the range of 0.52 to 1.13 V by the external DC power supply. Thus, oxygen is generated from the surface of the electrical catalyst 3 while the generation of chlorine is suppressed, so that the attachment of marine organisms to the titanium sheet 4 can be prevented.

According to the embodiment, the panel-like titanium sheet 4 previously coated with the electrical catalyst 3 can be easily bonded at an ordinary temperature to the seawater-exposed surface of the heat exchanger 1 via the insulating sheet 5 by means of the insulating adhesive 6. Thus, there is no possibility that the heat exchanger 1 is damaged by thermal stresses or the like. In addition, electrical insulation between the titanium pipe plate 1a and panel-like the titanium sheet 4 can be achieved by the insulating adhesive 6 and the insulating sheet 5 interposed therebetween. Consequently, abnormal corrosion of metal members electrically connected to the titanium pipe plate 1a can be prevented.

In addition, according to the embodiment, since the electrical catalyst 3 is a single substance of a metal of the platinum group, a metal oxide of the platinum group, cobalt oxide or manganese oxide, a mixed crystal or a complex, the titanium sheet 4 is easily activated as an electrode, and elution rate of the titanium sheet 4 can be limited to a least extent. Thus, the oxygen can be stably generated for a long period of time. This effect is remarkable when anode current density is 3 A/m$^2$ or below.

In addition, according to the embodiment, since the insulating adhesive 6 is a high-performance elastic adhesive mainly containing a denatured silicone polymer and an epoxy resin and has a stable bond strength in the seawater temperature range of 0 to 50° C., stable and durable bond strength can be achieved. The insulating adhesive 6 is highly resistant against shocks exerted thereon by foreign because of elasticity thereof.

Anode potential is a function of current density in the surface of the anode. As the current density increases, the anode potential also increases, and hence oxygen generating rate increases in proportion thereto. That is, effective antifouling not detrimental to the environment can be realized, without generating chlorine and annihilating marine organisms, by maintaining the anode potential around 1.13 V.

Then, FIG. 2 is a schematic sectional view of an antifouling system for a structure to be exposed to seawater in a second embodiment according to the present invention. As shown in FIG. 2, the antifouling system 20 for the structure to be exposed to seawater of the second embodiment is identical with the antifouling system in the first embodiment shown in FIG. 1, except that no insulating sheet 5 is provided and that a panel-like titanium sheet 4 is bonded directly to a seawater-exposed surface exposed to seawater 15 of a heat exchanger 1 via only an insulating adhesive 6. In the second embodiment, parts like or corresponding to those in the first embodiment shown in FIG. 1 are denoted by the same reference characters, and description thereof will be omitted.

Like the second embodiment, even if the insulating sheet 5 is not provided, the electrical insulation of the titanium pipe plate 1a or the like and the panel-like titanium sheet 4 from each other can be achieved, and abnormal corrosion of metal members electrically connected to the titanium pipe plate 1a or the like can be prevented, provided that the insulating adhesive 6 is capable of providing satisfactory electrical insulation.

Then, FIG. 3 is a schematic sectional view of an antifouling system for a structure to be exposed to seawater in a third embodiment according to the present invention. As shown in FIG. 3, in the antifouling system 20 for a structure exposed to seawater of the embodiment, a titanium sheet 4 is divided into and formed by a plurality of pieces each of which is cut from a sheet-like tape having a width of 1 m or below according to a size of a pipe plate 1a. The titanium pieces are bonded to the pipe plate 1a via an insulating adhesive 6. Conductive tapes 9 are placed on the titanium pieces to ensure the electrical connection of adjacent titanium pieces.

Other structure is the same as the second embodiment shown in FIG. 2. In the third embodiment, parts like or corresponding to those in the second embodiment shown in FIG. 2 are denoted by the same reference characters, and description thereof will be omitted.

Preferably, the conductive tapes 9 and the titanium sheet 4 are formed of the same material.

According to the embodiment, the titanium sheet 4 can be transported to a work site, after receiving a catalyst coating process, a thermal activation process that heats the titanium sheet 4 in the range of 350 to 450° C. for several hours by means of an electrical resistance heating or the like and an opening forming process for the heat transfer pipes 1b in a plant or the like. Especially, since the titanium sheet 4 has a thickness in the range of 0.1 to 0.3 mm and a width not greater than 1 m, the titanium sheet 4 can be wound in a coil, and hence can be inserted and mounted through a manhole whose usual inside diameter is about 600 mm. The electrical connection of the adjacent panel-like titanium sheets 4 is ensured by the conductive tapes 9.

Figure 4:
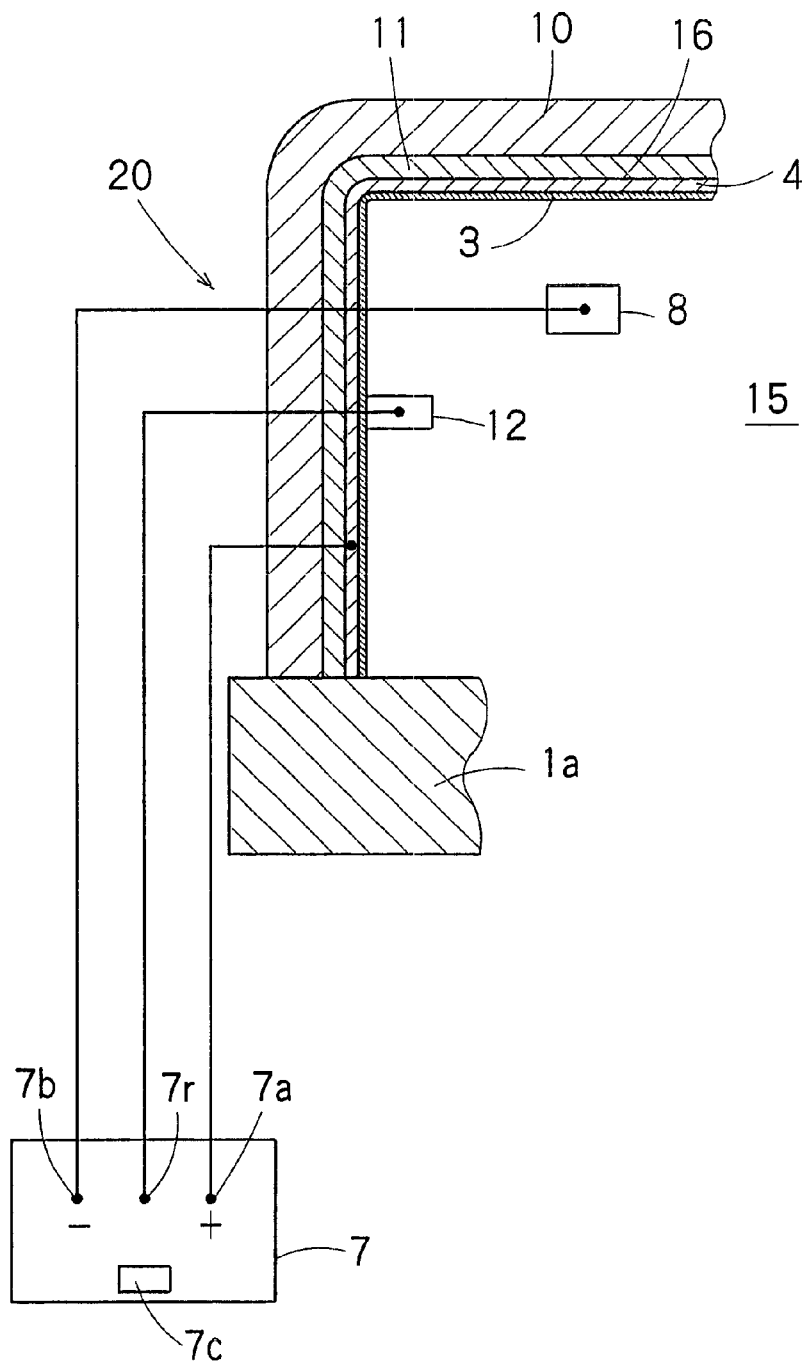
FIG. 4 is a schematic sectional view of an antifouling system for a structure to be exposed to seawater in a fourth embodiment according to the present invention.

Then, FIG. 4 is a schematic sectional view of an antifouling system for a structure to be exposed to seawater in a fourth embodiment according to the present invention. As shown in FIG. 4, the antifouling system 20 for a structure exposed to seawater generates oxygen on seawater-exposed surfaces of rubber linings 11 (structures) provided at a seawater receiving side and a seawater discharge side of a water chamber 10, in order to suppress attachment of marine organisms to the rubber linings 11.

In the antifouling system 20, a panel-like titanium sheet 4 (anode forming member) of a thickness in the range of 0.1 to 0.3 mm is bonded to the surfaces facing seawater 15 of the rubber linings 11 with an adhesive 16. The adhesive 16 does not need to be insulating. It is preferable to use conductive tapes 9 as shown in FIG. 3 when the titanium sheet 4 is divided into a plurality of pieces.

Other structure is the same as that in the first embodiment shown in FIG. 1. In the fourth embodiment, parts like or corresponding to those in the first embodiment shown in FIG. 1 are denoted by the same reference characters, and description thereof will be omitted.

According to the embodiment, oxygen is generated on the surface of the electrical catalyst 3 provided on the rubber lining 11, while suppressing the generation of chlorine. Thus, the attachment of marine organisms to the surface facing seawater 15 of the insulating rubber lining 11 can be prevented.

Then, FIG. 5 is a schematic sectional view of an antifouling system for a structure to be exposed to seawater in a fifth embodiment according to the present invention. As shown in FIG. 5, the antifouling system 20 for a structure exposed to seawater of the embodiment generates oxygen on surfaces facing seawater 15 of a concrete intake channel 14 (structure) through which cooling seawater is taken, in order to suppress the attachment of marine organisms to the concrete intake channel 14. The antifouling system 20 of the fifth embodiment shown in FIG. 5 is the same as the fourth embodiment shown in FIG. 4, except that the conductive members 8 are formed as reinforcing bars (partly in contact with seawater 15) of the concrete intake channel 14. In the fifth embodiment, parts like or corresponding to those of the fourth embodiment shown in FIG. 4 are denoted by the same reference characters, and description thereof will be omitted.

According to the embodiment, the oxygen is generated from on the surface of the electrical catalyst 3 provided on surfaces facing seawater 15 of the insulating concrete intake channel 14 for taking cooling seawater, while suppressing the generation of chlorine. Thus, the attachment of marine organisms to the surfaces facing seawater 15 of the concrete intake channel 14 can be prevented.

In addition, the panel-like titanium sheet 4 can be bonded to various insulating members of resins or the like including the rubber lining 11, the concrete intake channel 14, and so on.

What is claimed is:

1. An antifouling system that generates oxygen on a seawater-exposed surface of a structure to be exposed to seawater to prevent attachment of marine organisms to the seawater-exposed surface of the structure, said antifouling system comprising:
   an anode forming member bonded to the seawater-exposed surface of the structure to be exposed to seawater via an insulating adhesive;
   an electrochemically active and stable electrical catalyst coated on the anode forming member;
   a conductive member disposed so as to be wetted with seawater; and
   an external DC power supply having a positive terminal connected to the anode forming member or the electrical catalyst and a negative terminal connected to the conductive member, and including an automatic potential controller;
   wherein a potential difference between the positive and the negative terminals of the external DC power supply is set in order to generate oxygen in seawater while suppressing generation of chlorine in seawater.

2. The antifouling system according to claim 1, wherein an insulating sheet is disposed between the seawater-exposed surface of the structure to be exposed to seawater and the anode forming member.

3. The antifouling system according to claim 1, wherein the electrical catalyst is a single substance of a metal of platinum group, a metal oxide of platinum group, cobalt oxide or manganese oxide, a mixed crystal substance thereof or a complex substance thereof.

4. The antifouling system according to claim 1, wherein the anode forming member is a titanium member.

5. The antifouling system according to claim 4, wherein the titanium member is a titanium sheet.

6. The antifouling system according to claim 5, wherein the titanium sheet has a thickness in a range of 0.1 to 0.3 mm and is capable of being wound in a coil.

7. The antifouling system according to claim 5, wherein the titanium sheet is divided into a plurality of pieces, and conductive tapes are provided to electrically connect adjacent pieces with each other.

8. The antifouling system according to claim 1, wherein the insulating adhesive is an elastic adhesive mainly containing a modified silicone polymer and an epoxy resin and providing a stable bond strength when temperature of seawater is in a range of 0 to 50° C.

9. The antifouling system according to claim 1, wherein
the structure to be exposed to seawater is a titanium heat exchanger having a plurality of titanium heat transfer pipes and one or more titanium pipe plates supporting the plurality of titanium heat transfer pipes, and
the anode forming member is provided with a plurality of openings corresponding to diameters of the plurality of titanium heat transfer pipes.

10. An antifouling system that generates oxygen on a seawater-exposed surface of an insulating part of a structure to be exposed to seawater to prevent attachment of marine organisms to the seawater-exposed surface of the insulating part of the structure, said antifouling system comprising:

an anode forming member provided at the insulating part of the structure;
an electrochemically active and stable electrical catalyst coated on the anode forming member;
a conductive member disposed so as to be wetted with seawater; and
an external DC power supply having a positive terminal connected to the anode forming member or the electrical catalyst and a negative terminal connected to the conductive member, and including an automatic potential controller;
wherein the potential difference between the positive and the negative terminals of the external DC power supply is set in order to generate oxygen in seawater while suppressing generation of chlorine in seawater.

11. The antifouling system according to claim 10, wherein
the electrical catalyst is a single substance of a metal of platinum group, a metal oxide of platinum group, cobalt oxide or manganese oxide, a mixed crystal substance thereof or a complex surface thereof.

12. The antifouling system according to claim 10, wherein
the anode forming member is a titanium member.

13. The antifouling system according to claim 12, wherein,
the titanium member is a titanium sheet.

14. The antifouling system according to claim 13, wherein
the titanium sheet have a thickness in a range of 0.1 to 0.3 mm and is capable of being wound in a coil.

15. The antifouling system according to claim 13, wherein
the titanium sheet is divided into a plurality of pieces, and conductive tapes are provided to electrically connect adjacent pieces with each other.

16. The antifouling system according to claim 10, wherein
the seawater-exposed surface of the insulating part of the structure to be exposed to seawater is a wall surface coated with a rubber or resin lining.

17. The antifouling system according to claim 10, wherein
the structure to be exposed to seawater is a concrete structure, and
the conductive member is a reinforcing bar for the concrete structure.

* * * * *